(12) United States Patent
Neuwirt

(10) Patent No.: US 10,179,615 B2
(45) Date of Patent: Jan. 15, 2019

(54) APPARATUS, SYSTEM, AND RELATED METHODS FOR HOLDING AND MANEUVERING AN INDUSTRIAL VEHICLE SPARE TIRE

(71) Applicant: George's Tire Caddy, LLC, Sunapee, NH (US)

(72) Inventor: George M. Neuwirt, Sunapee, NH (US)

(73) Assignee: GEORGE'S TIRE CADDY, LLC, Sunapee, NH (US)

( * ) Notice: Subject to any disclaimer, the term of this patent is extended or adjusted under 35 U.S.C. 154(b) by 0 days.

(21) Appl. No.: 15/441,534

(22) Filed: Feb. 24, 2017

(65) Prior Publication Data

US 2017/0267295 A1    Sep. 21, 2017

Related U.S. Application Data

(60) Provisional application No. 62/308,451, filed on Mar. 15, 2016.

(51) Int. Cl.
| | |
|---|---|
| *B62D 43/00* | (2006.01) |
| *B66D 3/06* | (2006.01) |
| *B66D 5/34* | (2006.01) |
| *B66D 1/60* | (2006.01) |
| *B62D 43/02* | (2006.01) |
| *B66D 3/02* | (2006.01) |

(52) U.S. Cl.
CPC .......... *B62D 43/002* (2013.01); *B62D 43/02* (2013.01); *B66D 1/60* (2013.01); *B66D 3/02* (2013.01); *B66D 3/06* (2013.01); *B66D 5/34* (2013.01)

(58) Field of Classification Search
CPC .... B62D 43/02; B62D 43/002; B62D 43/045; B66D 3/06; B66D 1/60; B66D 2700/0116; B66D 5/34; Y10T 70/5991
USPC ........ 157/1.1, 1.28, 16; 212/180; 224/42.12, 224/42.21, 42.27, 510, 536, 554, 557, 224/570; 254/154; 414/426, 462, 463, 414/466, 543
See application file for complete search history.

(56) References Cited

U.S. PATENT DOCUMENTS

| | | | | | |
|---|---|---|---|---|---|
| 944,956 | A | * | 12/1909 | Dunlap ................. | B66D 1/005 224/42.29 |
| 978,976 | A | * | 12/1910 | Wolff ..................... | B60B 30/06 157/1.38 |
| 1,083,321 | A | * | 1/1914 | Gunstone ............... | B60B 23/10 152/427 |
| 1,234,409 | A | * | 7/1917 | Strifler .................. | B62D 43/02 224/42.12 |
| 1,329,475 | A | * | 2/1920 | Pritner .................. | B62D 43/02 224/42.16 |

(Continued)

*Primary Examiner* — Gregory W Adams
(74) *Attorney, Agent, or Firm* — Hayes Soloway P.C.

(57) ABSTRACT

An apparatus, system, and related methods for holding and maneuvering an industrial vehicle spare tire include a tire support positioned on an industrial vehicle. An industrial vehicle tire is removably securable to the tire support, wherein the tire support has at least two independently adjustable threaded members for controlling engagement of the tire support and the industrial vehicle tire. A winch is positioned proximate to the gate of the industrial vehicle. At least one pulley is positioned above the tire support, wherein at least one winch cable is connected between the winch and the at least one pulley.

12 Claims, 16 Drawing Sheets

(56) References Cited

U.S. PATENT DOCUMENTS

| | | | | |
|---|---|---|---|---|
| 1,364,437 A * | 1/1921 | Jerabek | B62D 43/02 | 224/42.29 |
| 1,405,378 A * | 1/1922 | Lawrence | B62D 43/02 | 414/466 |
| 1,422,932 A * | 7/1922 | Crossley | B62D 43/00 | 224/42.28 |
| 1,460,592 A * | 7/1923 | Lawrence | B62D 43/02 | 414/464 |
| 1,512,553 A * | 10/1924 | Mach | B62D 43/02 | 224/42.19 |
| 1,513,612 A * | 10/1924 | Lane | B62D 43/02 | 157/1.11 |
| 1,599,327 A * | 9/1926 | Greenwood | B62D 43/02 | 157/1.11 |
| 1,610,493 A * | 12/1926 | Doherty | B62D 43/00 | 224/42.2 |
| 1,672,356 A * | 6/1928 | Wasserfallen | B62D 43/04 | 224/42.21 |
| 1,681,864 A * | 8/1928 | Long | B62D 43/02 | 157/1.11 |
| 1,712,440 A * | 5/1929 | Kirby | B62D 43/00 | 224/42.29 |
| 1,804,222 A * | 5/1931 | Mascuch | B60C 25/132 | 157/1.26 |
| 1,879,304 A * | 9/1932 | Kennedy | B62D 43/002 | 414/463 |
| 1,881,223 A * | 10/1932 | Nichols | B60G 11/12 | 224/42.25 |
| 1,966,766 A * | 7/1934 | Raby | B60C 25/132 | 157/1.1 |
| 2,377,149 A | 5/1949 | Heil | 224/29 | |
| 2,509,950 A * | 5/1950 | Zierke | B60P 1/5433 | 212/202 |
| 2,661,130 A * | 12/1953 | Evans | B62D 43/045 | 224/42.21 |
| 2,873,777 A * | 2/1959 | Thostenson | B60C 25/132 | 157/1.24 |
| 3,554,397 A | 1/1971 | Cluff | 214/451 | |
| 3,870,179 A * | 3/1975 | Colpitts | B62D 43/002 | 414/466 |
| 3,930,584 A * | 1/1976 | Davis | B60P 3/1016 | 414/462 |
| 4,042,157 A * | 8/1977 | Weiler | B62D 43/02 | 224/401 |
| 4,095,709 A * | 6/1978 | Eller | B62D 43/002 | 224/42.21 |
| 4,155,472 A | 5/1979 | Dansbury | 414/466 | |
| 4,191,316 A * | 3/1980 | Baumgartner | B60R 9/10 | 224/532 |
| 4,597,711 A | 7/1986 | Libermann | 414/427 | |
| 4,684,310 A * | 8/1987 | Stange | B60B 29/001 | 187/207 |
| 4,718,582 A * | 1/1988 | Iovenitti | B62D 43/02 | 224/42.21 |
| 4,869,409 A * | 9/1989 | Wright | B62D 43/02 | 224/42.21 |
| 4,948,024 A | 8/1990 | Warner et al. | 224/310 | |
| 5,180,274 A * | 1/1993 | Haugen | B60B 29/00 | 294/94 |
| 5,275,314 A | 1/1994 | Todenhagen | 224/42.01 | |
| 5,370,285 A | 12/1994 | Steelman | 224/42.021 | |
| 6,659,318 B2 | 12/2003 | Newbill | 224/503 | |
| 6,679,673 B1 * | 1/2004 | Stahler | B60P 1/5471 | 414/467 |
| 6,733,227 B2 | 5/2004 | Fitzgerald et al. | 414/486 | |
| 6,969,087 B2 | 11/2005 | Larson | 280/769 | |
| 7,195,231 B2 * | 3/2007 | Murphy | B62D 43/045 | 224/42.21 |
| 7,465,144 B1 | 12/2008 | Studer | 414/542 | |
| 7,845,895 B2 | 12/2010 | Barie et al. | 414/466 | |
| 8,092,142 B2 * | 1/2012 | Collins, Jr. | B60P 3/07 | 211/18 |
| 8,267,447 B2 * | 9/2012 | Shaw | B62D 43/002 | 294/67.2 |
| 8,777,070 B2 | 7/2014 | Moore et al. | 224/42.21 | |
| 8,840,000 B1 | 9/2014 | Simpson | 224/509 | |
| 2004/0050886 A1* | 3/2004 | Slovick | B62D 43/002 | 224/42.21 |

\* cited by examiner

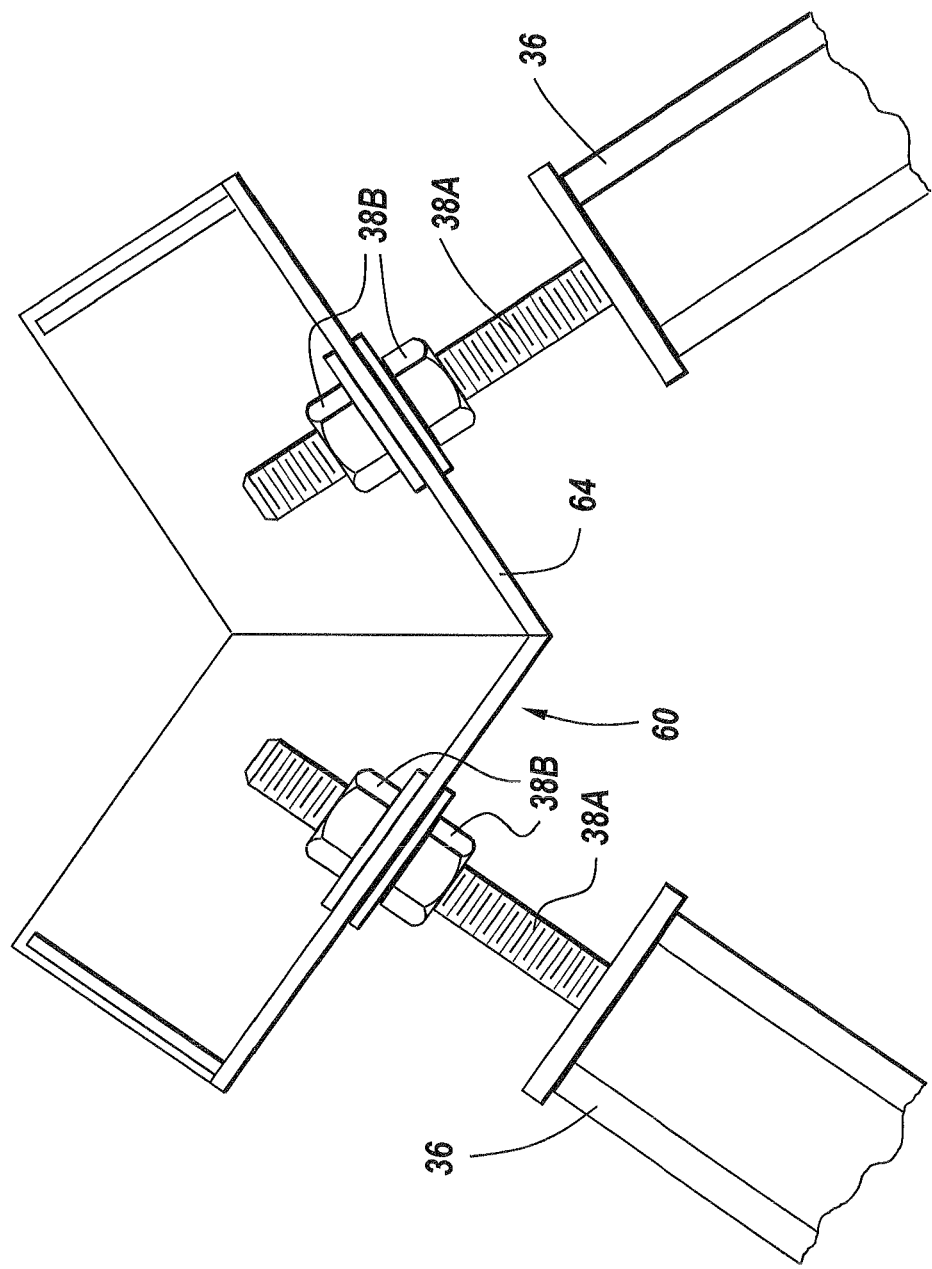

APPARATUS, SYSTEM, AND RELATED METHODS FOR HOLDING AND MANEUVERING AN INDUSTRIAL VEHICLE SPARE TIRE

CROSS REFERENCE TO RELATED APPLICATION

This application claims benefit of U.S. Provisional Application Ser. No. 62/308,451 entitled "Apparatus and related methods for holding and maneuvering an industrial vehicle tire" filed Mar. 15, 2016, the entire disclosure of which is incorporated herein by reference.

FIELD OF THE DISCLOSURE

The present disclosure is generally related to industrial vehicle tires and more particularly is related to an apparatus, system, and related methods for holding and maneuvering an industrial vehicle spare tire.

BACKGROUND OF THE DISCLOSURE

Large machinery and construction equipment require large, durable, and heavy-duty components to enable them to carry extensive payloads and otherwise perform the jobs that are required of them. When one of these components fails, a worker tasked with the repair must not only possess the mechanical skill and knowledge involved in the repair or replacement, but also the physical strength to maneuver and position the components as needed. It is especially challenging when the repair or replacement must be completed in the field and without the equipment a repair shop would use to aid in the repair or replacement, including overhead lifts, winches, and other tools used to move heavy parts.

One example that highlights this problem of performing a repair on large machinery outside of a repair shop is when a tire of a dump truck is punctured, torn, or otherwise fails when the dump truck is out in the field. Once the driver of the dump truck identifies the damaged tire—often with a very loud sound—he or she must immediately stop the vehicle or risk damaging adjacent tires due to the rubber and steel bands in the damaged tire lacerating the sidewalls of nearby tires. The driver must then either attempt to replace the tire themselves, which conventionally virtually never occurs, or they must call for someone to come assist with replacing the tire. Tire replacement by the driver happens so rarely because most dump trucks do not carry spare tires, since there is often no place for the spare tire to be stored on the truck, and because even if a spare tire was present, it is too heavy for a single dump truck driver to maneuver themselves. Unlike passenger car tires or similar tires, dump truck tires are very large and very heavy, often weighing upwards of 200 lbs.; too great for one person to move without assistance. For this reason, it is almost unheard of for a dump truck driver to replace his or her own damaged tire in the field.

The only practical way to replace the tire is to contact a mechanic or repair shop that will drive out to the location of the disabled dump truck and bring a new tire to replace the damaged one. As one could imagine, this situation is highly inefficient. Not only is it frustrating to the driver, the owner of the dump truck, and the party awaiting whatever payload the dump truck is carrying to need to wait for the new tire to arrive and for the repair to be completed, it is highly economically inefficient to have an expensive piece of equipment temporarily out of use. If the dump truck is located in a remote location or if the tire requires repair during non-working hours of nearby repair shops, the dump truck can sit idle waiting for the repair for many hours. The cost from the downtime of such a situation occurring can easily exceed many hundreds of dollars, easily over one thousand dollars depending on the situation. Outside of the economics, such a situation effectively prevents a dump truck driver from exercising self-sustenance, instead requiring them to be fully reliant on others.

Thus, a heretofore unaddressed need exists in the industry to address the aforementioned deficiencies and inadequacies.

SUMMARY OF THE DISCLOSURE

Embodiments of the present disclosure provide an apparatus, system, and method for holding and maneuvering an industrial vehicle spare tire. Briefly described, in architecture, one embodiment of the apparatus, among others, can be implemented as follows. A tire support is positioned on an industrial vehicle, wherein an industrial vehicle tire is removably securable to the tire support, wherein the tire support has at least two independently adjustable threaded members for controlling engagement of the tire support and the industrial vehicle tire. A winch is positioned proximate to the gate of the industrial vehicle. At least one pulley is positioned above the tire support, wherein at least one winch cable is connected between the winch and the at least one pulley.

The present disclosure can also be viewed as providing a vehicle-mounted industrial vehicle spare tire support apparatus for carrying an open rim industrial vehicle tire on an industrial vehicle. Briefly described, in architecture, one embodiment of the apparatus, among others, can be implemented as follows. At least three rim-engagement devices are connected to a back plate. At least two of the at least three rim-engagement devices are independently adjustable of one another, wherein the at least two independently adjustable rim-engagement devices are movable towards an exterior edge of the back plate. The movement of the at least two independently adjustable rim-engagement devices controls an engagement and disengagement of the open rim industrial vehicle tire to the apparatus.

The present disclosure can also be viewed as providing methods for maneuvering an industrial spare tire from a tire holding apparatus carried on an industrial vehicle. In this regard, one embodiment of such a method, among others, can be broadly summarized by the following steps: releasing a lock on a tire support positioned on a gate of the industrial vehicle, whereby releasing the lock comprises independently adjusting at least two threaded members to disengage the industrial spare vehicle tire from the tire support; adjusting a tilt angle of the gate of the industrial vehicle; actuating a winch to release an industrial spare tire from the tire support, wherein the winch is connected to the spare tire with a cable positioned through at least one pulley positioned vertically above the tire support on the gate; and lowering the industrial spare tire to a ground surface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4G are illustrations of a first embodiment of the tire support, in accordance with the first exemplary embodiment of the subject disclosure.

DETAILED DESCRIPTION

Figure 1:
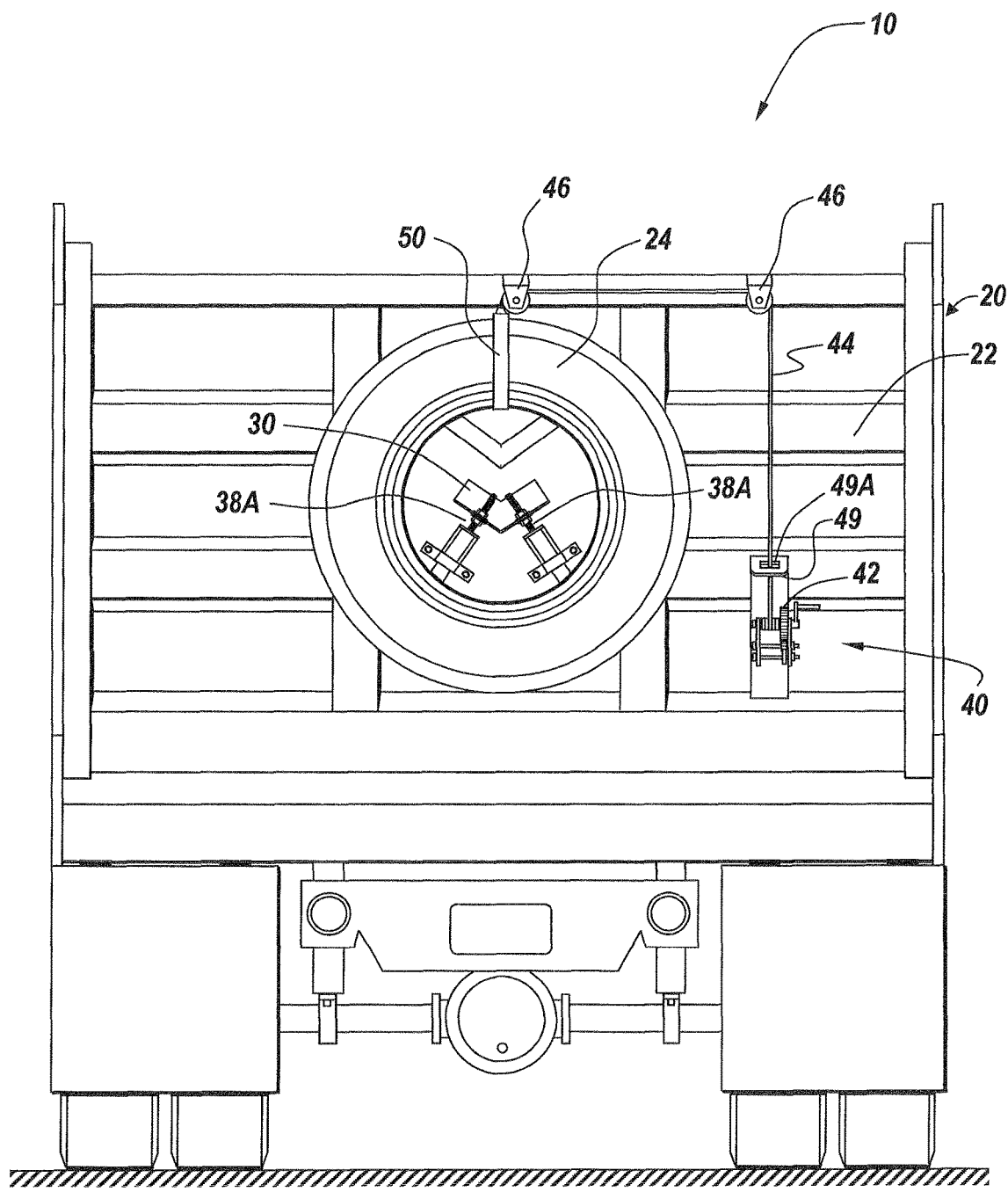
FIG. 1 is a side view illustration of an apparatus for holding and maneuvering an industrial vehicle spare tire, in accordance with a first exemplary embodiment of the present disclosure.
Figure 6A:
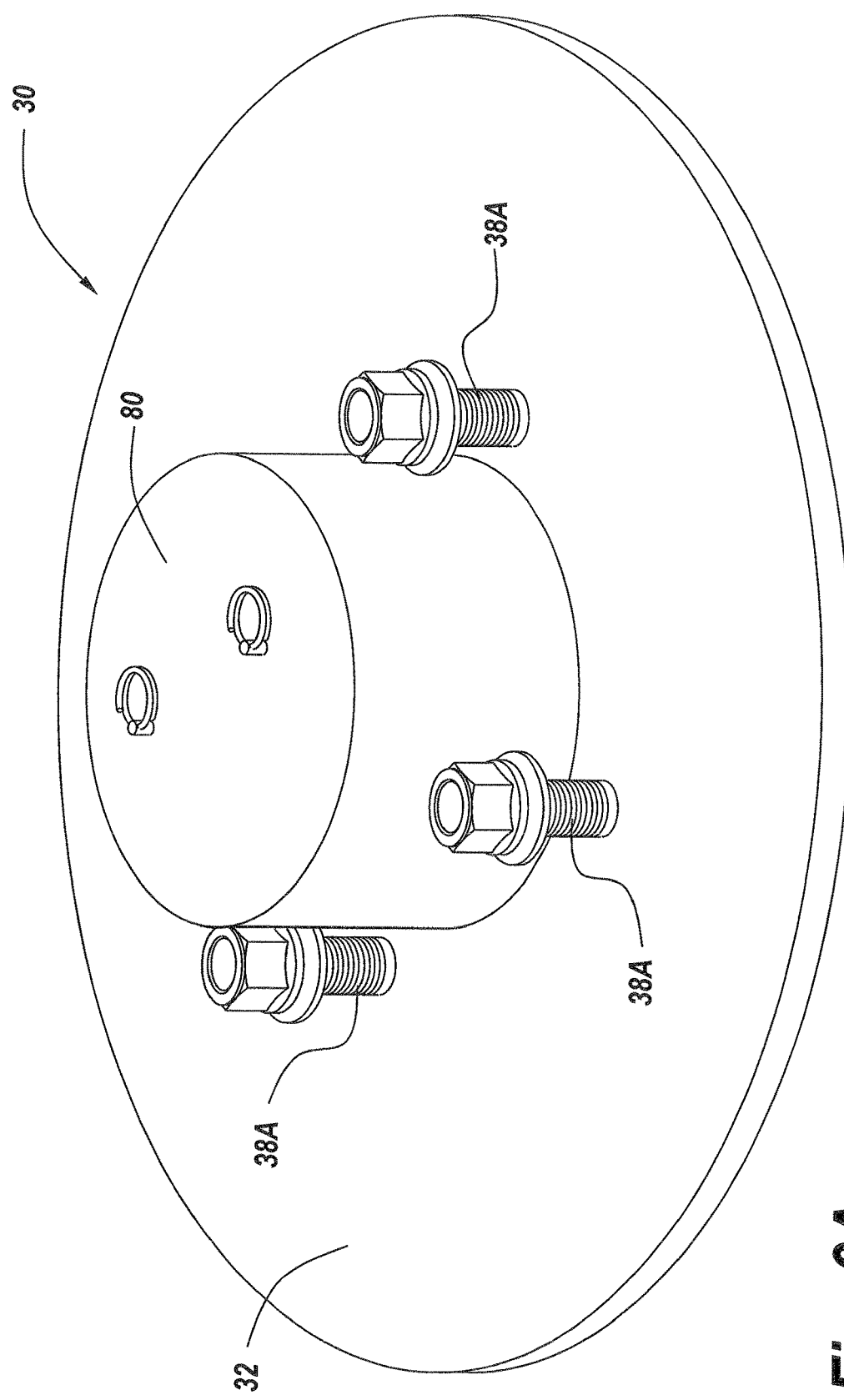
FIGS. 6A-6C are elevated side view and front view illustrations of a second design of the tire support, in accordance with the first exemplary embodiment of the subject disclosure.
Figure 6B:
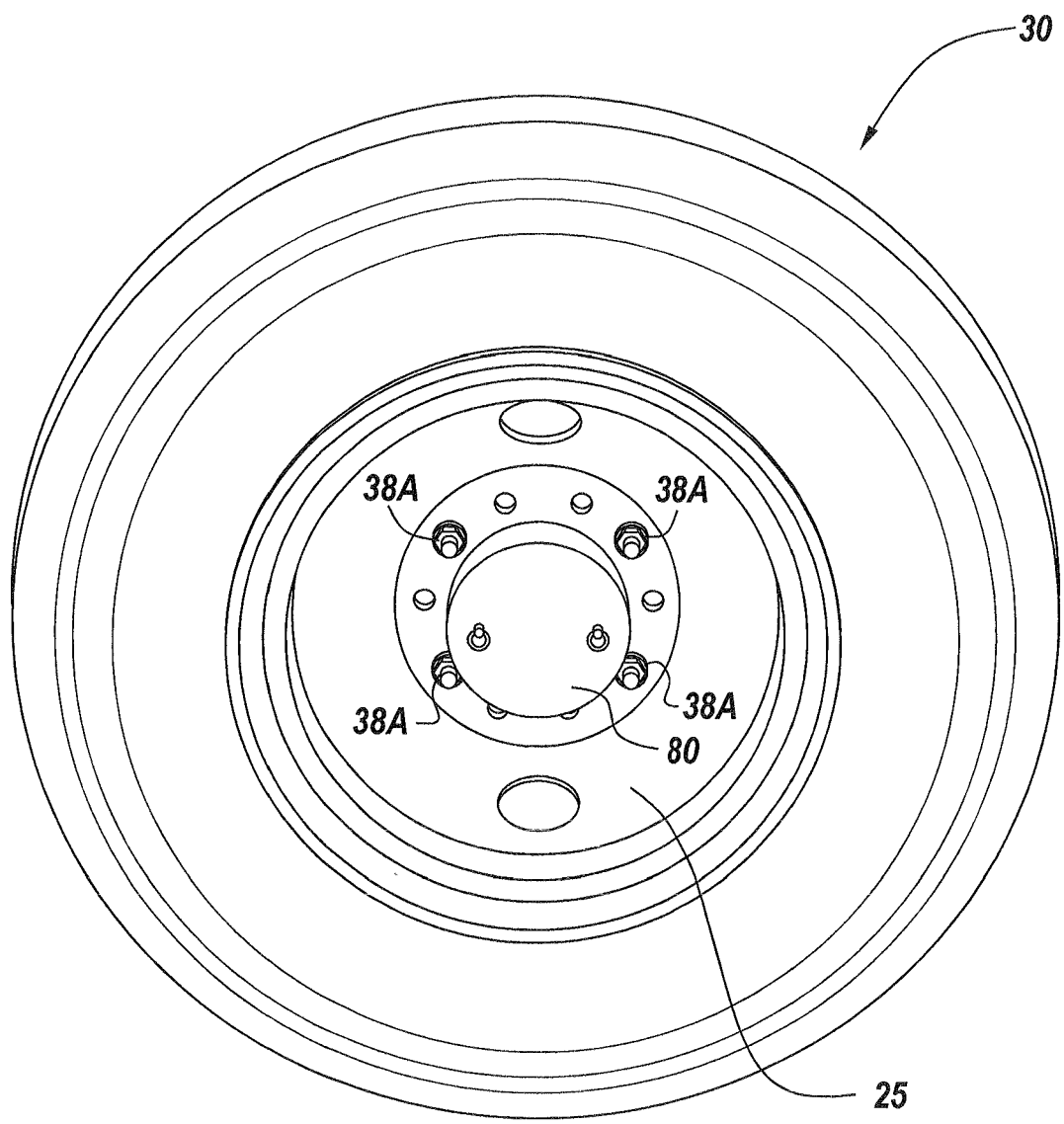
Figure 6C:
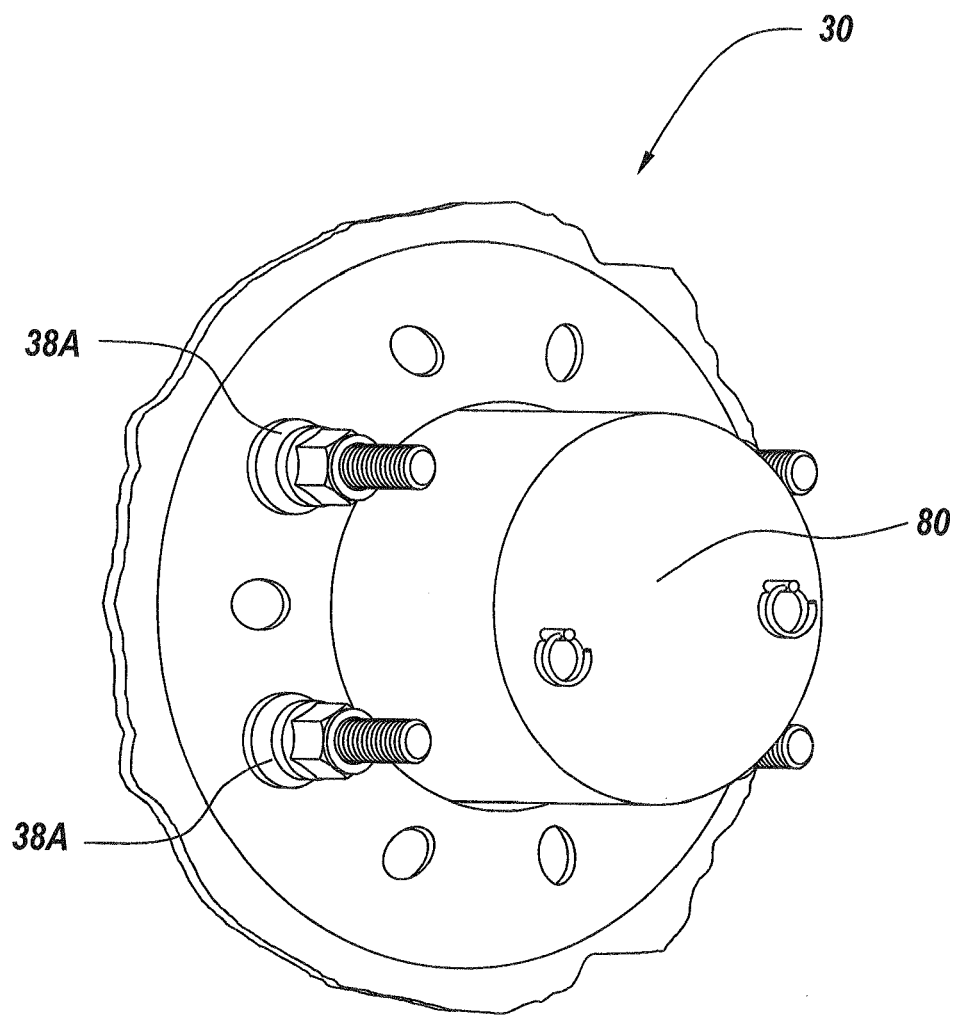

FIG. 1 is a side view illustration of an apparatus for holding and maneuvering an industrial vehicle spare tire 10, in accordance with a first exemplary embodiment of the present disclosure. The apparatus for holding and maneuvering an industrial vehicle spare tire 10, which may be referred to herein simply as 'apparatus 10', is designed to be integrated into an industrial vehicle 20, such as a dump truck or other heavy piece of construction equipment. More specifically, the apparatus 10 is designed to be used with an industrial vehicle 20 which uses a plurality of non-steering tires in the rear of the vehicle 20 referred to in the industry as 'drive tires.' These drive tires are large, heavy duty, and mount to the vehicle 20 using an open rim or open face design which has a cylindrical perimeter wall positioned along the interior sealing edges of the tire, as shown in FIG. 1. To connect or mount the open rim tire to the vehicle 20, the open rim includes various integrated contours on its edges which allow it to be anchored to a hub of the vehicle 20. Accordingly, the invention can be used to retain open rim drive tires, but the invention may also be compatible with other types of industrial tires, such as drive tires which use lug nuts and/or lug bolts. These non-open rim tires, also referred to herein as closed rim tires, may include a rim with a central opening and a plurality of holes for lug nuts positioned about the central opening, such as shown in FIGS. 6A-6C. Commonly, this design of rims may be used for rims manufactured from aluminum, but they also exist for certain types of steel rims.

Further, it is noted that certain industrial vehicles may have more of a need for the apparatus 10 than other vehicles. For instance, the apparatus 10 may provide substantial benefits to non-tri-axle vehicles, which do not have extra space to carry a spare tire. These vehicles conventionally do not carry a spare tire at all since there is no place for one to be stored. In contrast, tri-axle dump trucks may be capable of carrying a spare tire between the cab of the truck and the bed. Likewise, other vehicles may already have holders for the spare tires on their trailers or beds. An 18-wheeler or tractor trailer, for example, conventionally has a basket under the floor of the trailer which carries a spare tire.

The apparatus 10 is shown on the vehicle 20 in FIG. 1 where, generally, it includes a tire support 30 positioned on a gate 22 of the industrial vehicle 20, such as a dump truck, as shown in FIG. 1. An industrial vehicle tire 24 is removably held within the tire support 30. The industrial vehicle tire 24 is carried as a spare tire for the industrial vehicle 20, such that it is available for use if one of the axle-mounted tires becomes damaged. The industrial vehicle tire 24 is retained within the tire support 30 with components that allow for engagement and disengagement of the industrial vehicle tire 24 with the tire support. These components include the use of at least two independently adjustable threaded members 38A, 38B which control the engagement of the tire support 30 and the industrial vehicle tire 24. For example, the two independently adjustable threaded members 38A, 38B may be used to control the movement of rim-engagement devices which can be moved to engage and disengage with the industrial vehicle tire 24. In FIG. 1, the two independently adjustable threaded members 38A, 38B are used to control the lower rim-engagement devices 34, as discussed further relative to FIGS. 4A-5. In other examples, the two independently adjustable threaded members 38A, 38B may include threaded posts mounted to the back plate 32 of the tire support 30, on which a closed rim industrial vehicle tire can be mounted to and retained in place with one or more threaded fasteners. An example of this design is shown in FIGS. 6A-6C. Regardless of the type of industrial vehicle tire 24 being carried by the apparatus 10, a winch 40 is positioned proximate to the gate 22 of the industrial vehicle 20 and at least one pulley 46 is positioned above the tire support 30. Actuation of the winch 40 is used to control a movement of at least one winch cable 44 connected between the winch 40 and the at least one pulley 46, and the industrial vehicle tire 24 when an industrial vehicle tire 24 is carried on the apparatus 10.

As can be seen in FIG. 1, the industrial vehicle tire 24 is retained in a position on the gate 22 of the vehicle 20 such that the vehicle 20 can operate without interference from the industrial vehicle tire 24. For example, the vehicle 20 is still capable of carrying a payload within a bed of the vehicle 20 and the bed is still capable of unloading that payload by tilting the bed of the vehicle 20 upwards and leaving the bottom of the gate 22 unlocked from the bed of the vehicle 20. Further, it is noted that mounting of the industrial vehicle tire 24 on the gate 22 still allows the gate 22 to pivot from a top side of the gate 22 where it is connected to the sidewalls of the bed. The industrial vehicle tire 24 moves in tandem with the gate 22 as the bed is raised and the bottom of the gate 22 pivots outwards to maintain a substantially vertical orientation of the gate 22.

The winch 40 may be a device having components that allow an operator to move or maneuver the heavy industrial spare tire 24 through the use of well-known mechanics. For example, the winch 40 may employ a ratchet mechanism 42 mounted towards a bottom of the gate 22 which is connected to the industrial spare tire 24 with a durable winch cable 44, such as a steel wire cable. The cable 44 may be positioned through one or more pulleys 46 which are positioned appropriately above and to the side of the tire support 30. In one example, as shown in FIG. 1, the apparatus 10 may include a first pulley 46 positioned in substantially direct vertical alignment above the ratchet mechanism 42, e.g., in a position laterally offset from the tire support 30, and a second pulley 46 positioned in substantially direct vertical alignment above the tire support 30 and substantially aligned with a center of the tire support 30. Engagement of the ratchet mechanism with a rotary handle or pivoting handle, among other types of handles, allows the cable 44 to extend or retract, which corresponds to opposing movement of the industrial spare tire 24 on the gate 20.

At the end of the cable 44, the apparatus 10 may employ a strap 50 which is secured around the industrial spare tire 24 and is durable enough to translate the movement of the cable 44 into movement of the industrial spare tire 24 itself. In one example, the strap 50 may include a heavy duty strap with a hook and loop fastener, a strap formed from a heavy duty woven fabric, such as polyester or a similar durable material, a metal strap, a metal wire with a hook for engaging with itself to create a loop, or another type of strap. The strap 50 may be connected to the end of the cable 44 with a hook, carabiner, or similar device which the operator can disengage to release the cable 44 and strap 50 from the industrial spare tire 24.

Figure 2A:
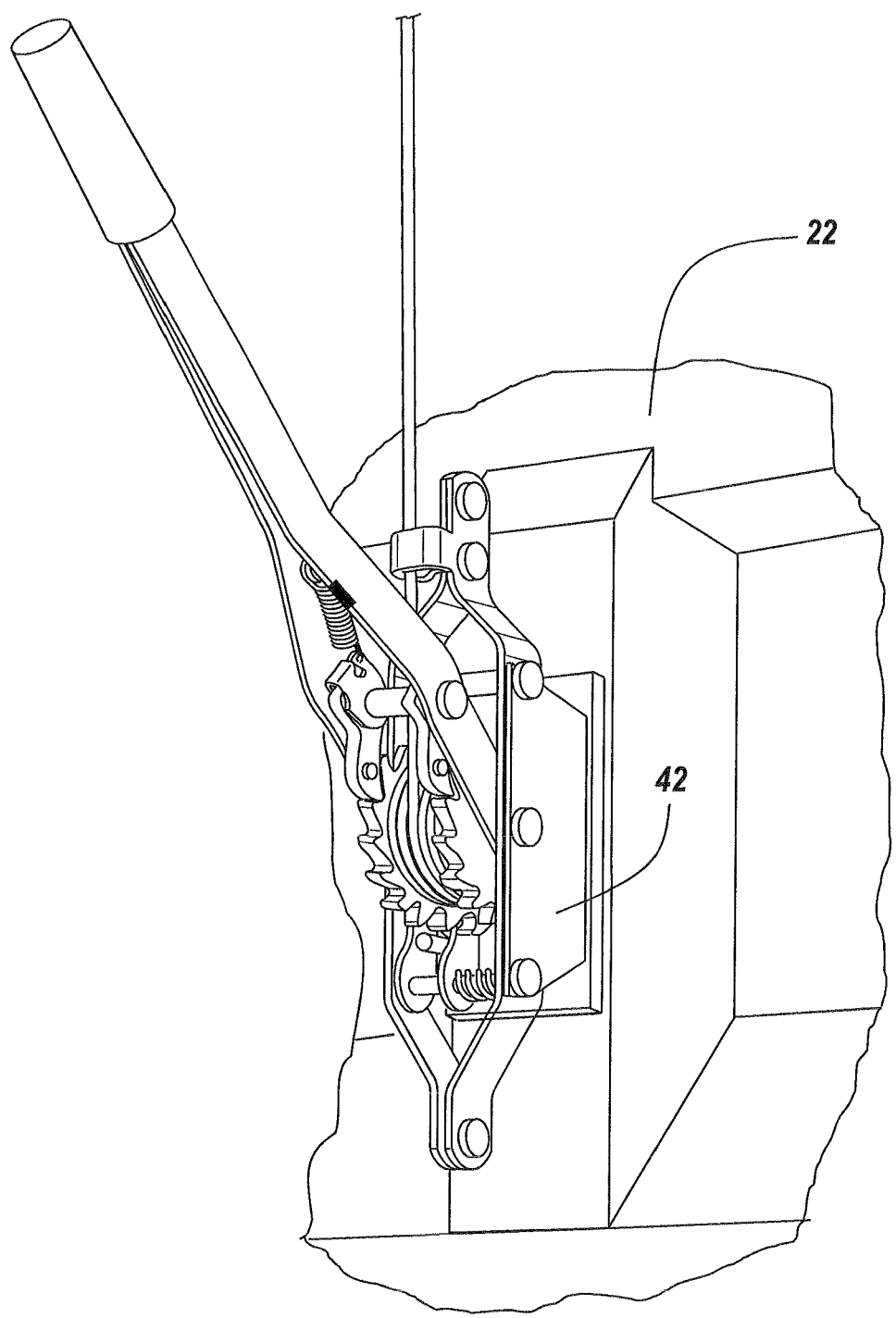
FIGS. 2A-2B are side perspective views illustration of ratchet mechanisms which can be used with the apparatus for holding and maneuvering an industrial vehicle spare tire of FIG. 1, in accordance with the first exemplary embodiment of the present disclosure.
Figure 2B:
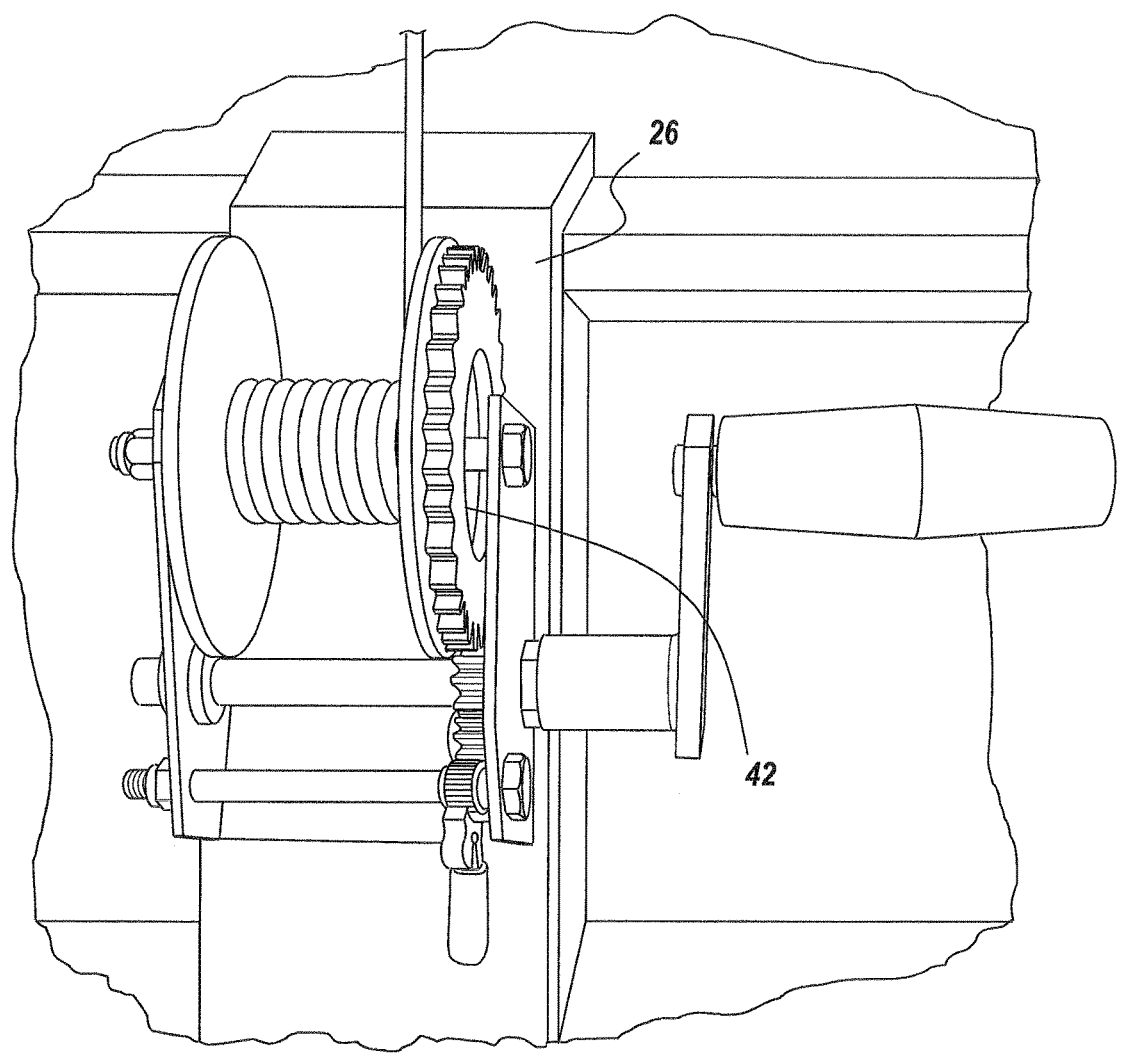

FIGS. 2A-2B are side perspective views illustration of ratchet mechanisms 42 which can be used with the apparatus for holding and maneuvering an industrial vehicle spare tire 10 of FIG. 1, in accordance with the first exemplary embodiment of the present disclosure. Specifically, FIG. 2A illustrates the ratchet mechanism 42 as a pivot handle ratchet which is mounted to the gate 22 of the body of the industrial vehicle. FIG. 2B, on the other hand, shows the ratchet mechanism 42 as a rotary handle ratchet device. While either a pivot handle or rotary handle ratchet mechanism 42 may be employed, it has been found through experimentation that a rotary handle with the ratchet mechanism 42 allows for more efficient raising and lowering of the tire than a pivot handle ratchet device since a rotary ratchet mechanism 42 has positive stops in both the front and reverse directions, in comparison to the pivot handle design which only allows the ability to lower the tire a few ratchet teeth at a time. As shown in FIG. 2B, when a ratchet mechanism 42 with a rotary handle is employed, it may be mounted on a raised rib 26 of the gate 22 and in a position between two horizontal ribs of the gate 22. In this position, the rotary handle may have appropriate clearance to rotate without interfering with the gate 22, or without placing the knuckles of an operator too close to the gate 22 and risking injury.

Relative to FIGS. 1-2B, regardless of the ratchet mechanism 42 used, it may be preferable for the first pulley 46 to be positioned substantially directly above the ratchet mechanism 42 and mounted near a top of the gate 22, and the second pulley 46 positioned substantially central on the gate 22 in substantially horizontal alignment with the first pulley 46. In this position, the end of the cable 44 having the strap 50 is able to hold the industrial spare tire 24 in a position on the gate 22 that is substantially centered latterly and vertically. It is noted that any number of additional pulleys can be used, and further noted that the winch 40 may be connected to the gate 22 by a variety of connections including welds, threaded fasteners, or other connections. Furthermore, as shown in FIGS. 1 and 2B, the winch 40 may further employ a guard 49 positioned vertically over the ratchet mechanism 42 which acts to protect it from falling debris, such as rocks carried in the bed of the industrial vehicle 20. The guard 49 may be constructed from a piece of metal which is welded to the gate 22 and has a slot 49A for the cable 44 to be positioned through.

Figure 3:
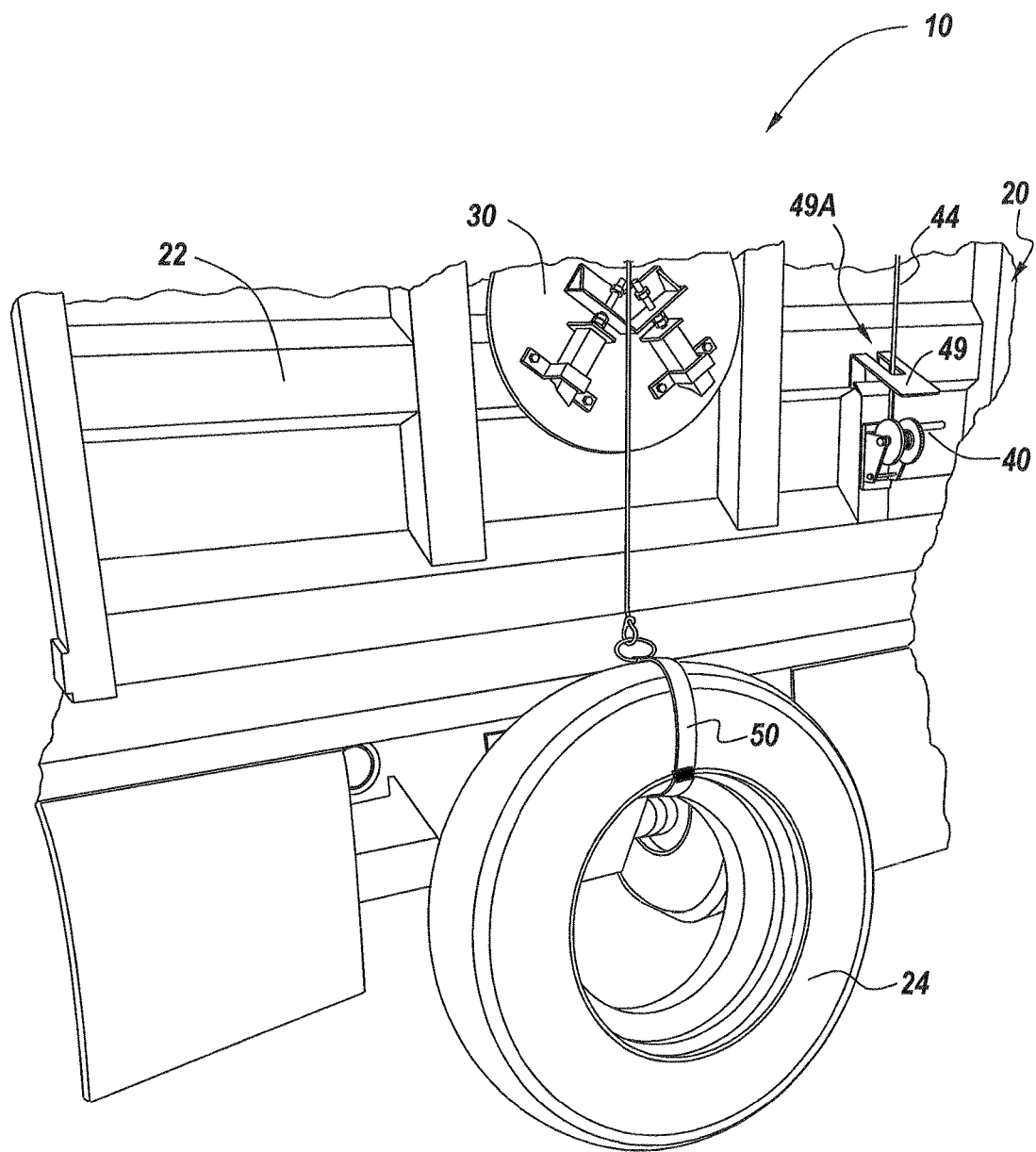
FIG. 3 is a detailed front view illustration of the apparatus for holding and maneuvering an industrial vehicle spare tire of FIG. 1, in accordance with the first exemplary embodiment of the present disclosure.

FIG. 3 is a detailed front view illustration of the apparatus for holding and maneuvering an industrial vehicle spare tire 10 of FIG. 1, in accordance with the first exemplary embodiment of the present disclosure. Specifically, FIG. 3 illustrates the apparatus 10 when the industrial spare tire 24 is positioned in a fully lowered position. This position is after the gate 22 has been angled outwards and the industrial spare tire 24 has been lowered on the cable 44 using the winch 40. In this position, the strap 50 may be removed from the industrial spare tire 24 to allow it to be rolled into place to repair a damaged tire on the vehicle. The damaged tire may then be connected to the strap 50 and the damaged tire can be lifted into place on the tire support 30 with the cable 44 and winch 40.

Relative to FIGS. 1-3, when the apparatus 10 is in use, the industrial vehicle 20 may be outfitted with the apparatus 10 and an industrial spare tire 24, which is carried by the vehicle 20 on the gate 22. If the vehicle 20 experiences a tire malfunction and replacement of the tire is needed, the operator of the vehicle may first disengage the industrial spare tire 24 from the tire support 30. Then the operator may tilt the gate 22 of the vehicle 20 slightly outwards by raising the bed of the vehicle 20 with the bottom of the gate 22 locked to the bed of the vehicle 20. Tilting of the gate 22 may be necessary due to the fact that the gate 22 is positioned at an approximate 10° angle to the vertical position when the gate 22 is locked to the bed of the vehicle 20 and the bed is not raised. This tilting of the gate 22 allows the gate 22 to be moved to a substantially vertical position where the bottom of the industrial spare tire 24 can move away from the bottom of the tire support 30 and thus become disengaged from the angular protrusions on the tire support 30 which were engaged with the contour of the open rim of the industrial spare tire 24. Without tilting, the industrial spare tire 24 may catch on the bottom of the tire support 30 and prevent it from being raised with the winch 40. Then, the operator may actuate the ratchet mechanism 42 to slightly raise the industrial spare tire 24 off the top of the tire support 30. Once freed from the top of the tire support 30, the industrial spare tire 24 may then be lowered with the winch 40 until it is resting on the ground surface. At this point, the operator may wheel the industrial spare tire 24 to the appropriate position on the truck so the damaged tire can be removed and this replacement industrial spare tire 24 can be installed on the vehicle's wheel hub.

It is noted that the apparatus 10 may be easily integrated into use with many industrial vehicles, especially dump trucks, and be compatible with the existing systems used on these vehicles. For example, the apparatus 10 may be configured to be used with a gate of a dump truck which has a construction sign mounted on it, e.g., a 'Do Not Follow' sign or the like. In this example, additional structures, such as additional bracketry and fasteners, may be used to allow a construction sign to be mounted exterior of the apparatus 10, such that the sign is still visible on the rear of the vehicle. Other adaptations of existing industrial vehicle features are also envisioned.

With the understanding of the existing state of changing an industrial tire in the field, as discussed in the Background of this disclosure, one having familiarity in the industry can see how the subject apparatus 10 can provide significant improvements in the field. With the apparatus 10, when a tire on a dump truck is damaged, a single person may be capable of unloading the new spare tire and replacing the damaged tire. Accordingly, what has conventionally required many hours of down time and at least two people can now be accomplished by a single person in about an hour. Furthermore, beyond increasing the efficiency of tire changes, the apparatus 10 greatly improves the safety of changing a tire. For example, the apparatus allows a person to safely control the lowering of a 200 lb. tire. With industrial vehicles which conventionally carry spare tires, simply moving the spare tire into position off the vehicle can be dangerous due to the weight of the tire. The apparatus 10 may also offer many other benefits within the industry beyond those explicitly noted herein, all of which are considered within the scope of the present disclosure.

The tire support 30 used with the apparatus 10 is a device that is mounted to the gate 22 of the vehicle 20 and removably holds the industrial spare tire 24 by contacting the rim on which the tire is mounted. There are a number of different designs and configurations for the tire support 30, including those which engage with open-rimmed spare tires, such as conventional drive tires used on dump trucks, or those which engage with closed-rimmed, drive tires with lugs. FIGS. 4A-7C illustrate different examples of the tire support 30 and how it engages with the open rim of a drive tire or a closed aluminum rim of a steer tire to hold either tire to the gate 22 of the vehicle.

Figure 4A:
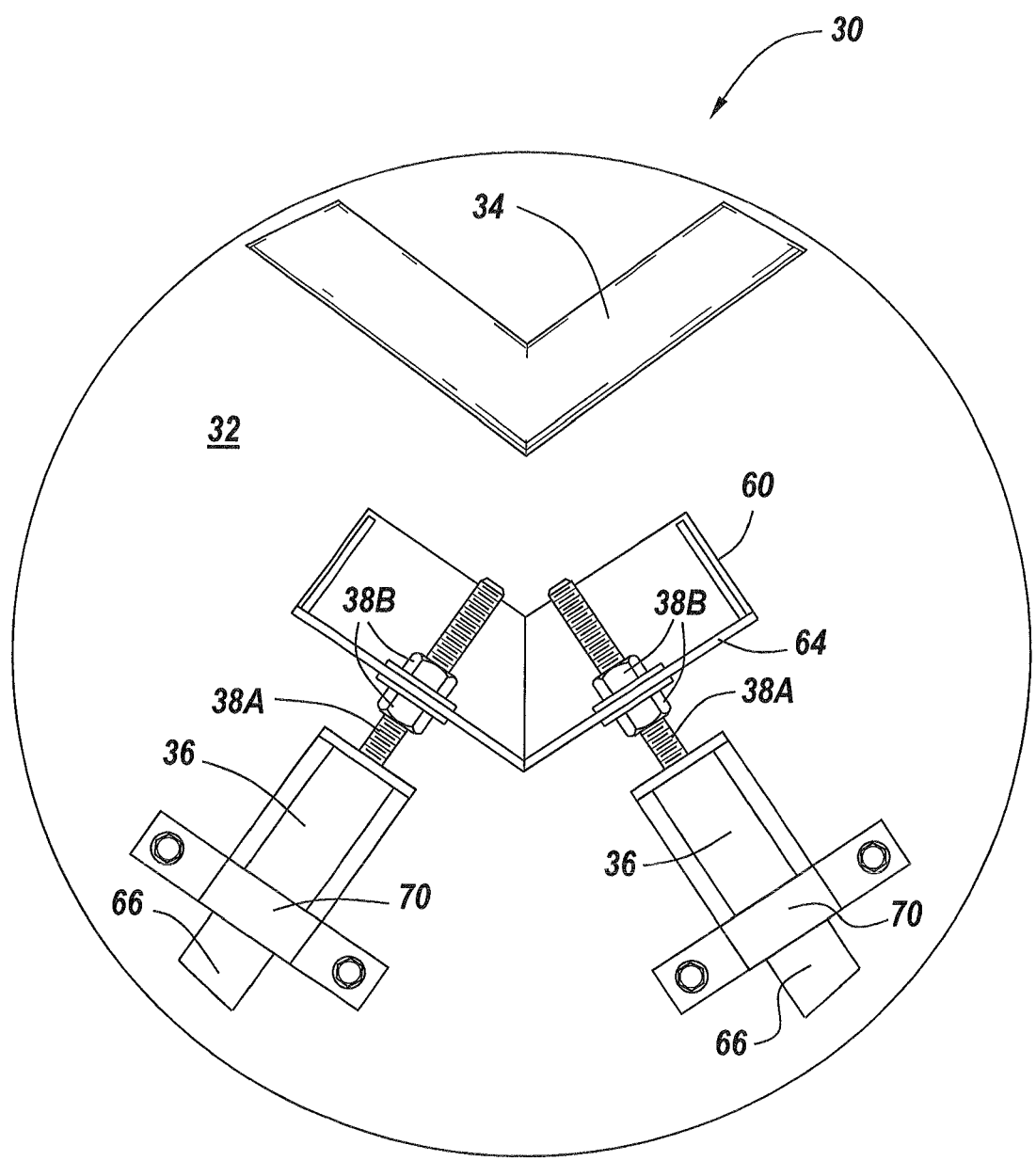

FIGS. 4A-4G are various illustrations of a first embodiment of the tire support 30, in accordance with the first exemplary embodiment of the subject disclosure. As is shown in FIG. 4A, the tire support 30 includes a back plate 32 which can be mounted to the gate 22 (FIGS. 1 and 3) of an industrial vehicle. To engage with the tire 24, at least three rim-engagement devices may be used. These generally include a top engagement device 34 is positioned at a top of the back plate 32 and bottom engagement devices 36 is positioned at a bottom of the back plate 32. In this example, the top engagement device 34 is a stationary device while the bottom engagement devices 36 are adjustable.

Figure 4B:
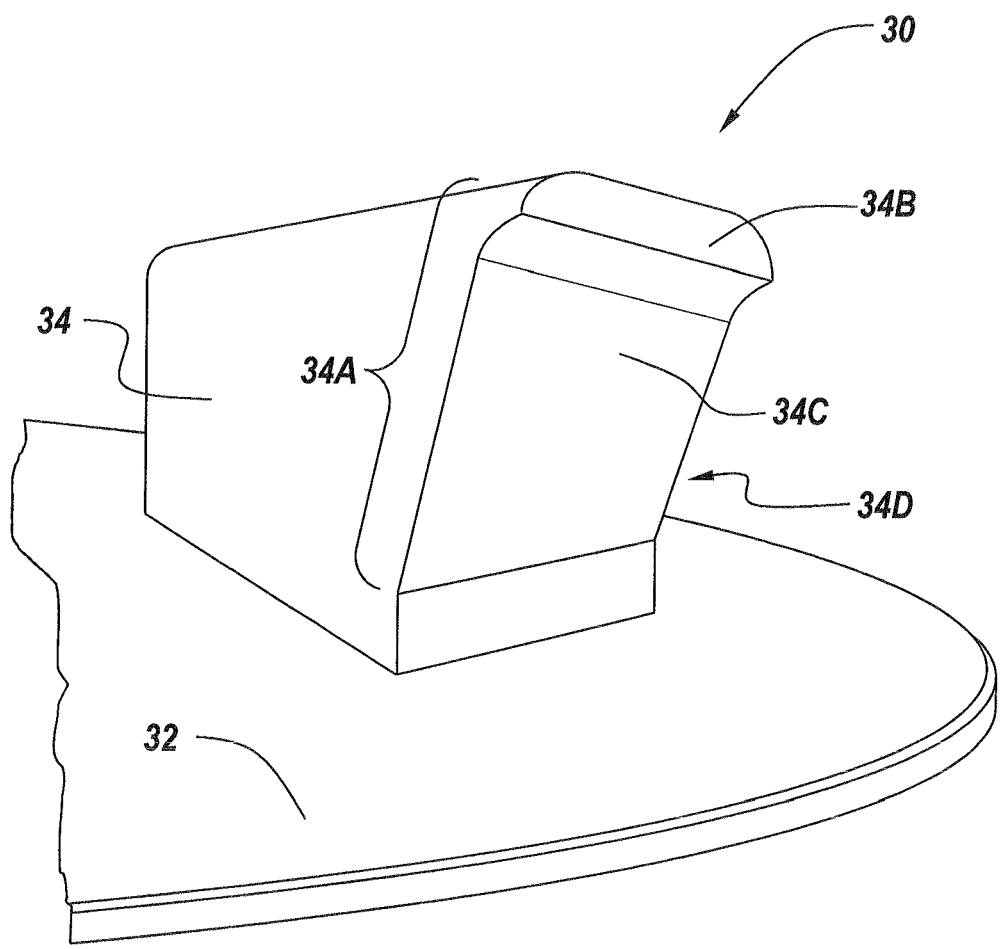

As shown in FIG. 4B, the top engagement device 34 may be welded to the back plate 32 or otherwise affixed thereto. The distal ends of the top engagement device 34 have an engagement tip 34A for engagement with the tire rim. The engagement tip 34A may be angled to match the contour of the open rim of the tire 24. This contour may include an outer pointed end 34B which is spaced offset from the planar surface of the back plate 32 and an inner recessed portion 34C positioned close to the planar surface of the back plate 32, such that the surface of the top engagement device 34 between the outer end and inner recessed portion contacts the contour of the open rim. The inner recessed portion of the engagement tip may form a concaved engagement space 34D relative to the back plate for the open rim of the tire 24 to fit within. As shown in FIG. 4A, the top engagement device 34 may include two separate legs connected together in a 'v' shape, but any number of legs may be used.

Figure 4D:
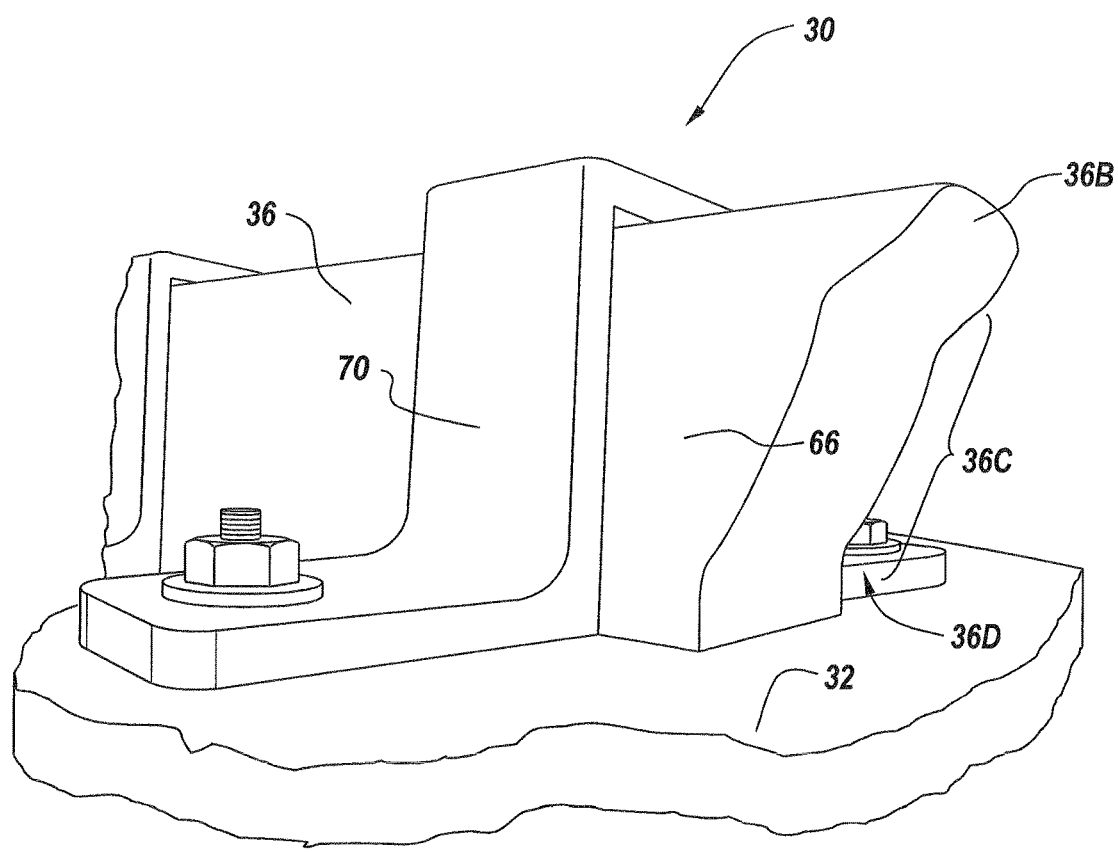

With reference to FIGS. 4A and 4C-4D primarily, the bottom engagement device 36 may include a bracket 60 welded to a midsection of the back plate 32. The bracket 60 may have a raised wall 64 which extends from the surface of the back plate 32 and includes at least two holes therein for receiving the threaded members 38A of the bottom engagement devices 36, which together act as a tensioner to bias the lower engagement tips 66 against a tire. The threaded members 38A may extend from a rear of the bottom engagement devices 36 and threaded fasteners 38B, such as nuts and locking nuts may be used to retain the threaded members 38A to the raised wall 64, such that each threaded members 38A is independently adjustable of the other. It may be preferable to use a single nut above the raised wall 64 and two nuts below the raised wall 64, such that the two nuts below it act to lock each other in a stationary position on the threaded members 38A. The threaded fasteners 38B may be positioned on each of the two threaded members 38A to control the movement of the threaded members 38A relative to a stationary bracket 60 affixed to the back plate 32, which in turn, controls the movement of the bottom engagement devices 36 to and from the exterior edge of the back plate 32.

The use of the two nuts may allow the nuts to be initially released (cracked) with a wrench and then spun to the desired position with a user's fingers, thereby saving time over using a wrench alone. A containment bracket 70 may be used with each of the bottom engagement devices 36 to retain it to the back plate 32 in a movable position, e.g., movable along the length of the bottom engagement devices 36, respectively. The containment brackets 70 may be welded to the back plate 32 or, more preferably, bolted to the back plate 32 as shown in FIG. 4D which allows them to be removed if they become damaged during use.

It is noted that the proper positioning of the top and bottom engagement devices 34, 36 may be selected to properly spread the forces exerted when the tire is clamped to the tire support 30. For example, the hold points on distal ends of each of the top and bottom engagement devices 34, 36 may be located directly in-line with the opposite points above or below, which acts to balance the transfer of force on the top and bottom engagement devices 34, 36.

Figure 4E:
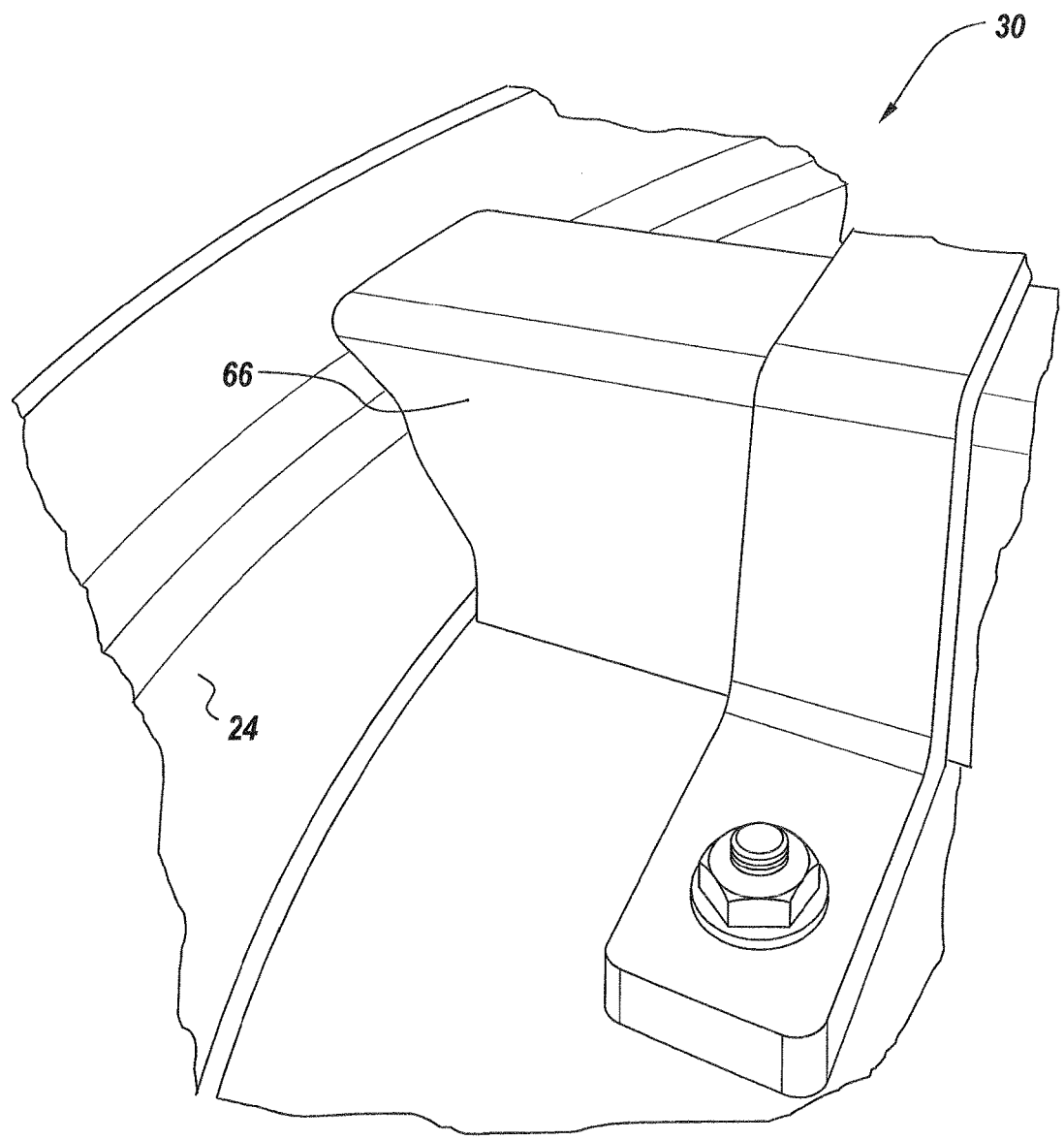

In use, the lower engagement tips 66 of the bottom engagement device 36 may be movable between extended and retracted positions, where the extended position is a position where the distal, terminating ends of the lower engagement tips 66 on the bottom engagement device 36 are extended to engage with the contour of the open rim of a tire 24, as shown in FIG. 4E. In this position, the lower engagement tips 66 may be angled to match the contour of the open rims. The refracted position of the lower engagement tips 66 is when the lower engagement tips 66 are withdrawn away from the open rim of the tire 24 such that the tire can be moved away from the planar face of the back plate 32. As shown in FIG. 4D, the contour may include an outer terminating end 36B which is spaced offset from the planar surface of the back plate 32 and an inner recessed portion 36C positioned close to the planar surface of the back plate 32, such that the surface of the top engagement device 34 between the outer end and inner recessed portion contacts the contour of the open rim. The inner recessed portion 36C of the lower engagement tip 66 may form a concaved engagement space 36D relative to the back plate for the open rim of the tire 24 to fit within.

Figure 4F:
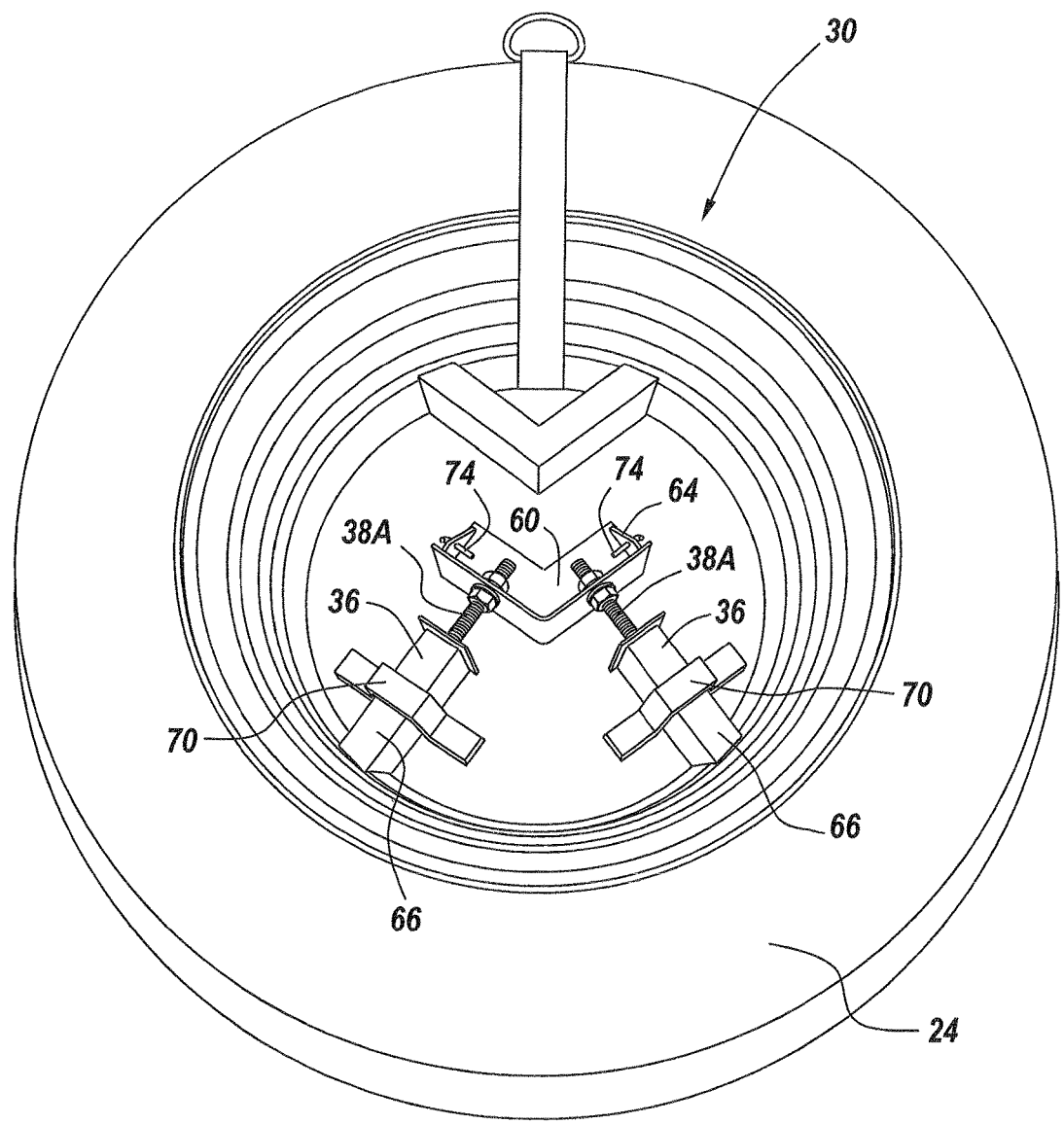
Figure 4G:
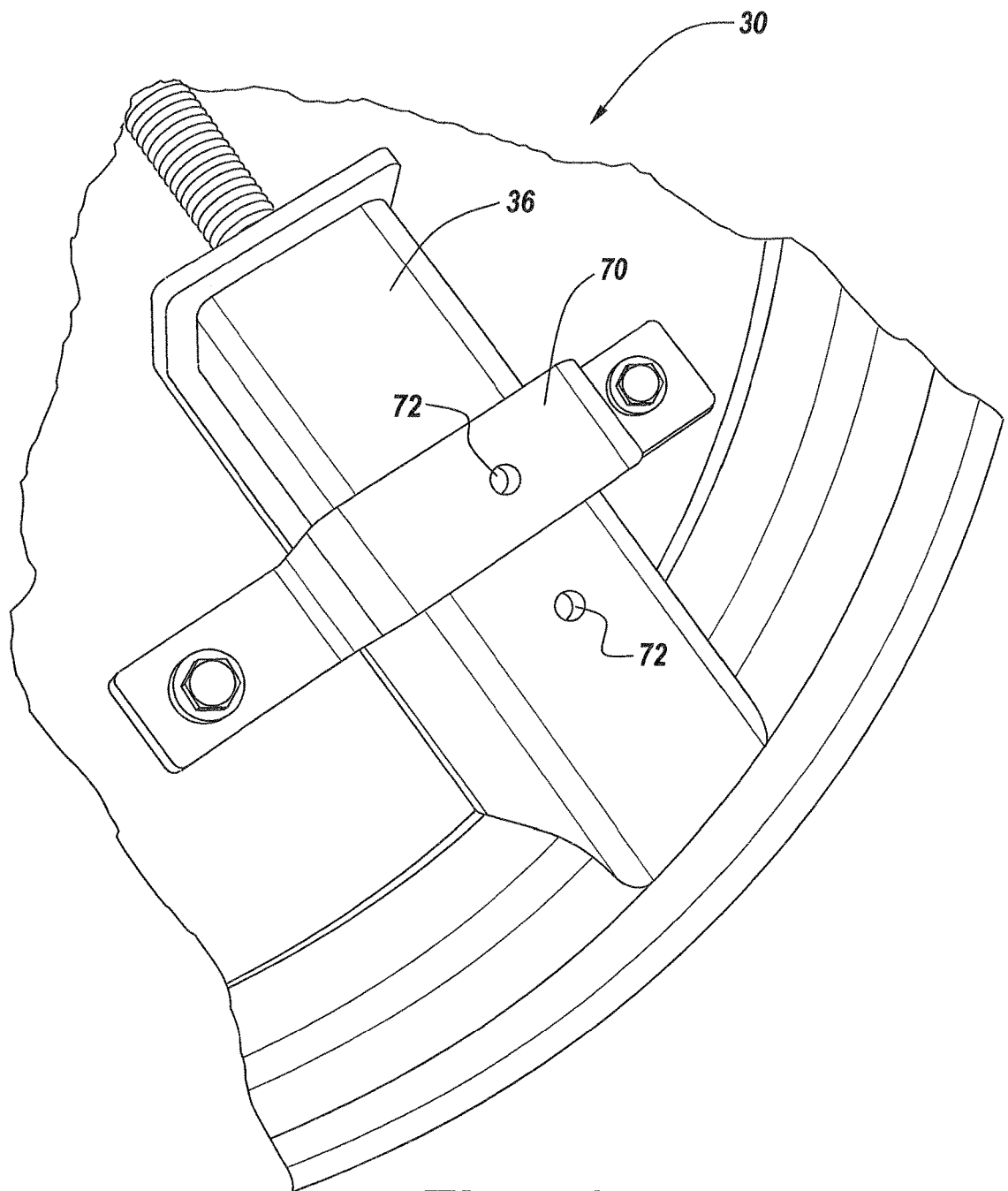

With reference to FIG. 4F, the lower engagement tips 66 may be movable between the extended and retracted positions by adjusting the nuts on the threaded members 38A. In FIG. 4F, the extended position is shown, such that the tire 24 is retained on the tire support 30. To remove the tire 24, one would loosen the bottom nut on each of the threaded ends 38A until it assumes a position near the rear edge of the bottom engagement devices 36. Then, the bottom engagement devices 36 may be raised within the containment brackets 70 an appropriate distance to allow the tire 24 to clear the lower engagement tips 66. In use, it may require a short period of time to manually move the threaded nuts on the threaded ends 38A with an open end wrench. Once the bottom engagement devices 36 are free to be moved upwards towards the bracket 60, a pin 74 can be used to hold the bottom engagement devices 36 in a stationary, retracted position on the containment brackets 70. FIG. 4G illustrates holes 72 formed in each of the bottom engagement devices 36 and the containment brackets 70 in which the pin 74 (FIG. 4F) can be placed. In FIG. 4F, the pin 74 is shown in a stored away position.

Figure 5:
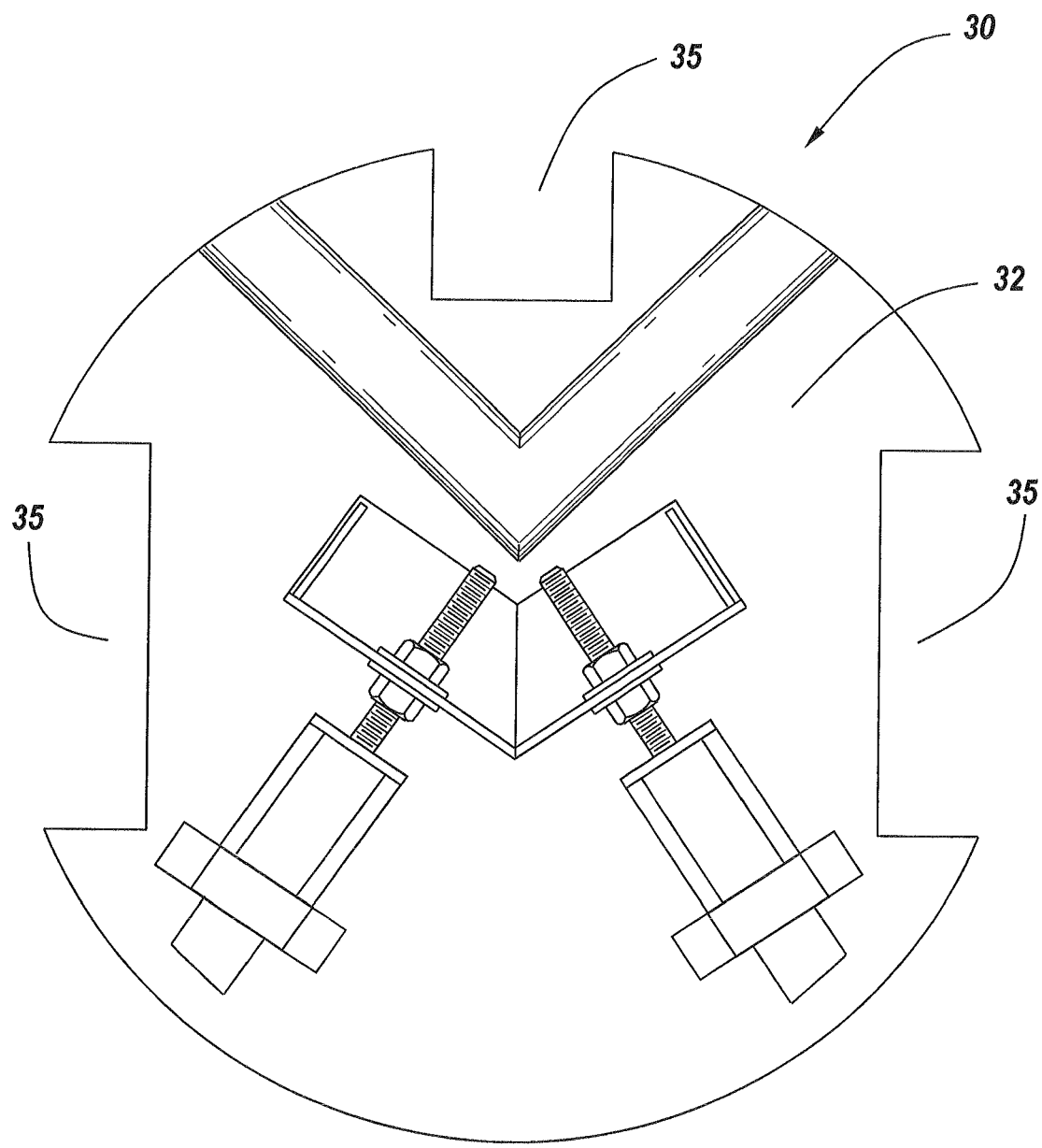
FIG. 5 is a front view illustration of the tire support with cutouts, in accordance with the first exemplary embodiment of the subject disclosure.

FIG. 5 is a front view illustration of the tire support 30 with cutouts, in accordance with the first exemplary embodiment of the subject disclosure. As shown, tire support 30 of FIG. 5 may have a plurality of cutouts 35 formed in the back plate 32 to allow the back plate 32 to sit flush on a gate of a vehicle that has contours. In particular, as shown in FIG. 1, the gates of most vehicles are not fully planar, since they have a number or ridges and raised members to provide structural support in the gate. The use of the cutouts 35 may allow for the back plate 32 to be properly mounted to the gate, allowing it to sit flush with enough of the gate to provide sufficient support to handle the heavy weight of the tire which is carried on the back plate 32. Further, the use of the cutouts 35 may be used to provide sufficient clearance to get a welder into that space behind the back plate 32 to be able to weld the back plate 32 to the gate of the truck during installation.

Relative to FIGS. 4A-5, it is noted that the apparatus 10 may have numerous different dimensions and sizes of the various components, all of which are considered to be within the scope of the present disclosure. In one example, the back plate 32 may be approximately 24 inches in diameter, with the side cutouts 35 being approximately 2.5 inches deep and 9.25 inches long, and the top cutout 35 being approximately 4.25 inches deep and 4.25 inches wide. The top engagement device 34 and bottom engagement devices 36 may be constructed from 2×2 inch steel tubing, where the top engagement device 34 has legs with approximate lengths of 7.5 inches and each of the bottom engagement devices 36 are approximately 6.625 inches in length. The bottom engagement devices 36 may be positioned approximately 0.25 inches off the back plate 32, such that the overall height of the bottom engagement devices 36 is 2.25 inches from the back plate 32. The threaded member 38A connected to the bottom engagement devices 36 may be constructed from 0.75 inch threaded rod and be approximately 4.5 inches in length. The bracket 60 may be constructed from a 2 inch steel "L" channel structure which has two lengths of approximately 6 inches which are connected in a "V" shape. The fasteners 38B used with the threaded members 38A may include two locking nuts below the bracket 60 and a single nylon locking nut above the bracket 60. The containment brackets 70 may be approximately 7 inches in overall length, with approximately 2.5 inches in length on either side of the bottom engagement devices 36. They may rise approximately 2.5 inches off the back plate 32, thereby allowing sufficient clearance for the bottom engagement devices 36 to move.

FIGS. 6A-6C are elevated side view and front view illustrations of a second design of the tire support 30, in accordance with the first exemplary embodiment of the subject disclosure. While the tire support 30 of FIGS. 4A-4G is used with an open rim tire, the tire support 30 of FIGS. 6A-6C may be used with a closed rim tire 25 that includes numerous attachment holes therein. Accordingly, the tire support 30 may include a back plate 32 with a primary cylindrical support 80 that is positioned through a central hole in the closed rim, as shown in FIG. 6B, and a plurality of threaded members 38A which can be positioned in the outer, smaller holes of the closed rim. Conventional lug nuts may be used to hold the closed rim tire 25 to the tire support 30. It is noted that the length of the primary cylindrical support 80 may be various lengths, depending on the design of the tire support 30. In one example, the primary cylindrical support 80 is approximately 8.5 inches in diameter and 4.5 inches tall, as measured off the back plate 32. The tire support 30 of FIGS. 6A-6C may be mounted to the gate of a vehicle, similar to as disclosed relative to FIGS. 1-5, and used in almost the same manner as previously described, with the difference being the disengagement procedure of FIGS. 6A-6C involves removing the lug nuts from the threaded members 38A.

Figure 7:
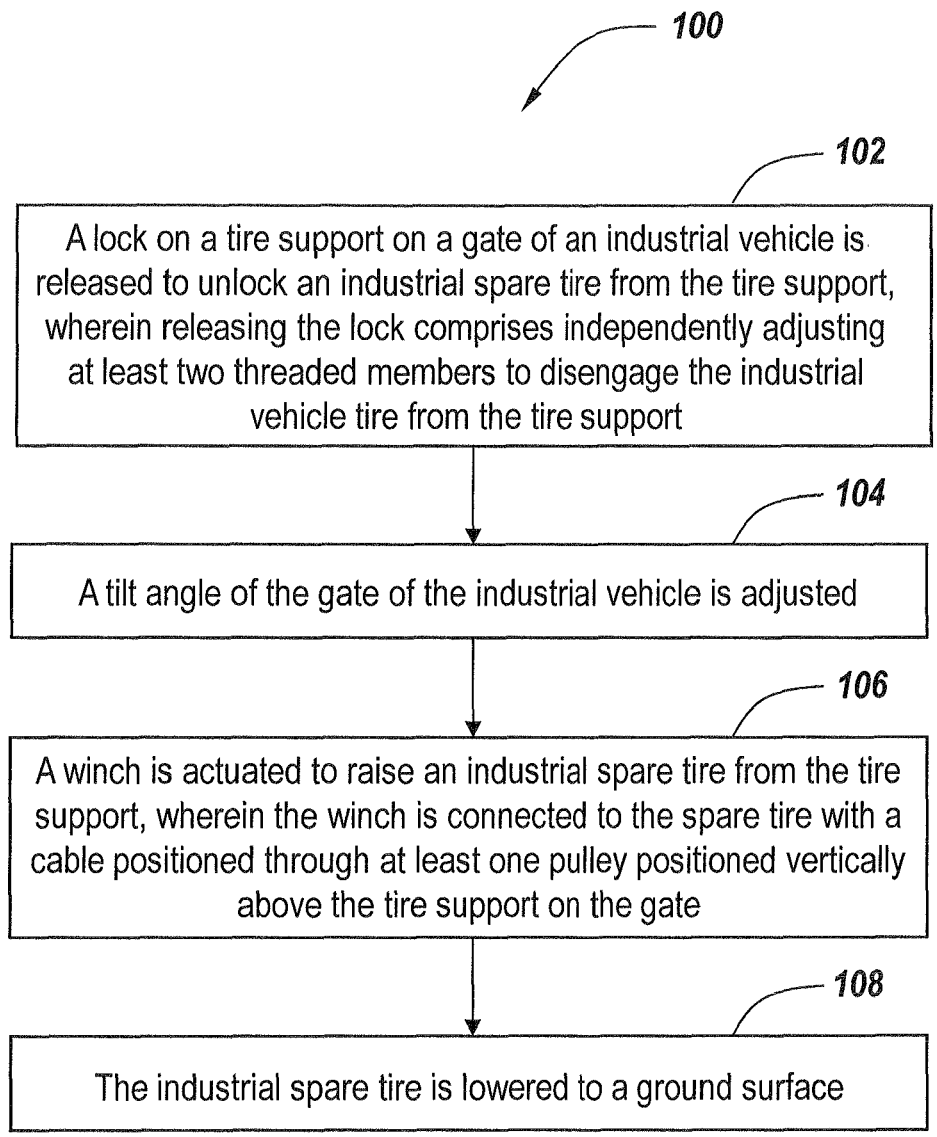
FIG. 7 is a flowchart illustrating a method for maneuvering an industrial spare tire from a tire holding apparatus carried on an industrial vehicle, in accordance with the first exemplary embodiment of the disclosure.

FIG. 7 is a flowchart 100 illustrating a method for maneuvering an industrial spare tire from a tire holding apparatus carried on an industrial vehicle, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a lock on a tire support positioned on a gate of an industrial vehicle is released to unlock an industrial spare tire from the tire support, wherein releasing the lock comprises independently adjusting at least two threaded members to disengage the industrial vehicle tire from the tire support. A tilt angle of the gate of the industrial vehicle is adjusted (block 104). A winch is actuated to raise an industrial spare tire from the tire support, wherein the winch is connected to the spare tire with a cable positioned through at least one pulley positioned vertically above the tire support on the gate (block 106). The industrial spare tire is lowered to a ground surface (block 108).

The method may further include any number of additional steps, processes, or functions, including any disclosed relative to any other figure of this disclosure. For example, the method may include releasing the lock on the tire support by rotating one or more threaded fasteners on each of the two threaded members, wherein each of the two threaded members is affixed to at least two independently adjustable rim-engagement devices, respectively, and raising the two independently adjustable rim-engagement devices to disengage an engagement tip on each of the two independent adjustable rim-engagement devices from a rim of the industrial spare vehicle tire. Further, the method may include disconnecting the cable from the industrial spare tire by removing a strap positioned through a center opening of the industrial spare tire and around an exterior of a tread of the industrial spare tire. Actuating the winch to release the industrial spare tire further may include actuating the winch to raise the industrial spare tire from upper engagement tips of rim-engagement devices affixed to the tire support.

Relative to the tire support of FIGS. 4A-4G, when the apparatus is used, the operator may tilt the gate of the vehicle slightly outwards by raising the bed of the vehicle with the bottom of the gate locked to the bed of the vehicle. The operator may then release the nut(s) on the threaded tips of the lower engagement device. Then, the operator may lift each of the lower engagement tips upwards until the holes on it and the containment bracket are aligned, thereby allowing the pin to be inserted. The pin keeps the lower engagement tips in the retracted or raised position. The operator may actuate the ratchet mechanism to slightly raise the industrial spare tire off the top engagement device of the tire support. Once freed from the top of the tire support, the industrial spare tire may then be lowered with the winch until it is resting on the ground surface. At this point, the operator may remove the strap from the tire and wheel the industrial spare tire to the appropriate position on the truck so the damaged tire can be removed and this replacement industrial spare tire can be installed on the vehicle's wheel hub. When installing a tire on the tire support, the reverse operation may be used. It is noted that the open rim tire may be capable of engaging with the upper engagement tips without the need to lower the bed to the fully down position, since the angle of the terminating ends of the upper engagement tips draw the rim in enough so that the entire rim sits flat against the back plate even with the tailgate angled outwards.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for holding and maneuvering an industrial vehicle spare tire, the apparatus comprising:
    a tire support positioned on an industrial vehicle, wherein an open rim industrial vehicle tire is secured to the tire support with at least two independently adjustable threaded members for controlling engagement between the tire support and the open rim industrial vehicle tire, wherein the at least two independently adjustable threaded members are movable in a substantially radial direction of the open rim industrial vehicle tire between a retracted position and an extended position, wherein in the extended position, an outer terminating end of a rim engagement device on each of the at least two independently adjustable threaded members contacts a rim surface of the open rim industrial vehicle tire, and wherein an engagement tip of each of the rim engagement devices, positioned proximate to the outer terminating end, forms a concaved engagement space relative to a back plate;
    at least one containment bracket for each of the rim engagement devices, wherein the at least one containment bracket is secured to a back plate and permits movement of the rim engagement devices therein;
    a winch positioned proximate to the gate of the industrial vehicle; and
    at least one pulley positioned above the tire support, wherein at least one winch cable is connected between the winch and the at least one pulley.

2. The apparatus of claim 1, wherein the tire support is positioned on a gate of the industrial vehicle.

3. The apparatus of claim 1, wherein the at least two independently adjustable threaded members are affixed to the rim engagement devices, respectively, wherein a threaded fastener on each of the at least two independently adjustable threaded members controls a movement of the at least two independently adjustable threaded members relative to a stationary bracket affixed to a back plate.

4. The apparatus of claim 1, further comprising a pin and hole mechanism having a first hole formed in the at least one containment bracket and a second hole formed in the rim engagement device therein, wherein the pin is positionable through first and second holes to retain the rim engagement device in a raised position.

5. The apparatus of claim 1, further comprising a stationary rim engagement device stationarily affixed to the back plate.

6. An apparatus for holding and maneuvering an industrial vehicle spare tire, the apparatus comprising:
    a closed rim tire support positioned on a rear gate of an industrial vehicle, wherein a closed rim industrial vehicle tire is secured to the closed rim tire support in an elevated, stationary position on the rear gate, wherein the closed rim tire support has at least two independently adjustable threaded members for controlling engagement of the closed rim tire support and the closed rim industrial vehicle tire, wherein the closed rim tire support has:
        a substantially planar back plate;
        a center post extending from a middle region of the back plate; and
        an attachment region of the back plate positioned radially outwards of the center post, wherein the at least two independently adjustable threaded members are positioned in the attachment region, wherein the at least two independently adjustable threaded members are connectable to lug holes of a closed rim industrial vehicle tire;
    a winch positioned proximate to the gate of the industrial vehicle; and
    at least two pulleys connected to the rear gate, wherein a first pulley of the at least two pulleys is located in a position fully vertically above the closed rim industrial vehicle tire and substantially aligned with a center of closed rim industrial vehicle tire, and a second pulley of the at least two pulleys is positioned between the first pulley and a lateral side of the gate, wherein at least one winch cable is connected between the winch and the closed rim industrial vehicle tire along a path through the first and second pulleys.

7. An apparatus for holding and maneuvering an industrial vehicle spare tire, the apparatus comprising:
    a tire support positioned on an industrial vehicle, wherein an industrial vehicle tire is removably securable to the tire support, wherein the tire support has at least two independently adjustable threaded members for controlling engagement of the tire support and the industrial vehicle tire, wherein the tire support further comprises an open rim tire support, comprising:
        a back plate; and
        at least three rim-engagement devices connected to the back plate, wherein at least two of the at least three rim-engagement devices are independently adjustable of one another using the at least two independently adjustable threaded members, respectively, wherein the at least two independently adjustable rim-engagement devices are movable towards an exterior edge of the back plate, wherein the at least two independently adjustable rim-engagement devices are engagable with an open rim industrial vehicle tire;
    a winch positioned proximate to the gate of the industrial vehicle; and at least one pulley positioned above the tire support, wherein at least one winch cable is connected between the winch and the at least one pulley.

8. The apparatus of claim 7, wherein each of the at least two independently adjustable rim-engagement devices has at least one engagement tip, wherein the engagement tip forms a concaved engagement space relative to the back plate.

9. The apparatus of claim 7, wherein the at least two independently adjustable threaded members are affixed to the at least two independently adjustable rim-engagement devices, respectively, wherein a threaded fastener on each of the at least two independently adjustable threaded members controls a movement of the at least two independently adjustable threaded members relative to a stationary bracket affixed to the back plate.

10. The apparatus of claim 7, further comprising at least one containment bracket for each of the two independently adjustable rim-engagement devices, wherein the at least one containment bracket is secured to the back plate and permits movement of the independently adjustable rim-engagement device therein.

11. The apparatus of claim 10, further comprising a pin and hole mechanism having a first hole formed in the at least one containment bracket and a second hole formed in the independently adjustable rim-engagement device therein, wherein the pin is positionable through first and second holes to retain the independently adjustable rim-engagement mechanism in a raised position.

12. The apparatus of claim 7, wherein at least one of the at least three rim-engagement devices is stationarily affixed to the back plate.

* * * * *